(12) United States Patent
Goodman

(10) Patent No.: US 6,560,703 B1
(45) Date of Patent: May 6, 2003

(54) REDUNDANT UPDATABLE SELF-BOOTING FIRMWARE

(75) Inventor: Brian Gerard Goodman, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/551,844

(22) Filed: Apr. 18, 2000

(51) Int. Cl.[7] ............................................. G06F 9/445
(52) U.S. Cl. ...................................................... 713/2
(58) Field of Search .................... 713/1, 2; 709/220, 709/222

(56) References Cited

U.S. PATENT DOCUMENTS

| | | | |
|---|---|---|---|
| 5,388,267 A | 2/1995 | Chan et al. | 395/700 |
| 5,933,631 A | 8/1999 | Mealey et al. | 395/652 |
| 5,940,627 A | 8/1999 | Luciani et al. | 395/834 |
| 5,974,567 A | 10/1999 | Dickson, Jr. et al. | 714/27 |
| 6,009,497 A | 12/1999 | Wells et al. | 711/103 |
| 6,018,629 A | 1/2000 | Tojima | 395/712 |
| 6,018,747 A | 1/2000 | Burns et al. | 707/203 |

*Primary Examiner*—Thomas M. Heckler
(74) *Attorney, Agent, or Firm*—John H. Holcombe

(57) ABSTRACT

A computer implemented method and a system for providing a redundant, updatable, self-booting firmware program. A sectored, non-volatile memory, having separately erasable sectors, stores at least two copies of operational code, each in at least one of the sectors separate from other of the copy sectors. Each operational code copy has information indicating the relative update level of the operational code copy, so that the copies may be separately updated and have different update levels. A boot program stored in at least one of the sectors of the non-volatile memory, separate from the operational code sectors, operates a processor to read the information from each of the copies to determine the most recent update level of the operational code copies, and executes the operational code copy having the most recent update level. The boot program, prior to reading the information, operates the processor to test the operational code copies to determine whether any of the operational code copies is corrupted, and only the header(s) of those copies determined to be uncorrupted in the testing is read.

32 Claims, 2 Drawing Sheets

REDUNDANT UPDATABLE SELF-BOOTING FIRMWARE

FIELD OF THE INVENTION

This invention relates to self-booting programs stored in non-volatile memories, and, more particularly, to self-booting programs that may be updated.

BACKGROUND OF THE INVENTION

Firmware, or programs stored in non-volatile memories, are employed in microprocessor systems which are used as specialized controllers or to implement specific functions. Examples are microprocessor systems to control data storage drives, to control accessors having interacting servo motors, or to control communication links between interacting mechanisms.

Embedded systems, where the microprocessor and firmware system is embedded in a component, may update the firmware in two ways. The first simply involves overwriting the non-volatile memory code with a new image at update time. The problem with this approach is that any fault during the firmware update process would result in "brain dead" product, which may require replacement of the component.

A second approach is to incorporate a boot sector to initialize the firmware system, and the boot sector usually can be erased and programmed separately from other parts of the code image. In this case, a firmware update fault would result in a working boot sector, so that the product would not function normally, but it could be fixed without component replacement. The problem with this approach is that it is sufficiently complicated that it requires human intervention or a special process to restore the product to an operational state. Also, the hardware transmission protocol that is used to update the firmware would have to be in an update routine contained in the boot sector. Any time the transmission routines or firmware update routines are changed, the boot sector must be changed. This results in a greater likelihood that the boot sector would encounter a firmware update fault. Using a boot sector in this manner becomes even more complex for products that use a variety of complex transmission protocols.

An error during a boot sector firmware update would be fatal, making the product essentially brain dead. Similarly, the boot sector may provide a recovery procedure to be employed if the rest of the non-volatile program device is corrupted or unusable. However, the complexity of the boot sector is increased dramatically, and these routines change fairly often, requiring the boot sector to be updated more often, again exposing the boot sector to a greater chance of error, making the product brain dead.

SUMMARY OF THE INVENTION

An object of the present invention is to increase the availability of error-free and updated firmware code.

Disclosed are a computer implemented method and a system for providing a redundant, updatable, self-booting firmware program. A sectored, non-volatile memory, having separately erasable sectors is provided, the memory storing at least two copies of operational code, each operational code copy stored in at least one of the sectors separate from other of the copy sectors. Each operational code copy has information, for example, in a header, indicating the relative update level of the operational code copy, so that the copies may be separately updated and have different update levels.

A boot program is stored in at least one of the sectors of the non-volatile memory, separate from the operational code sectors. The boot program operates a processor to read the update level information of the headers to determine the most recent update level of the operational code copies, and the boot processor executes the operational code copy having the most recent update level.

Additionally, the boot program, prior to reading the headers, operates the processor to test the operational code copies to determine whether any of the operational code copies is corrupted. If any of the operational copies is corrupted, only the header(s) of those copies determined to be uncorrupted in the testing are read, and the boot processor executes the operational code copy having the most recent update level.

Hence, a relatively simple boot program is employed, without a recovery routine, making the need to update the boot program a rare event.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
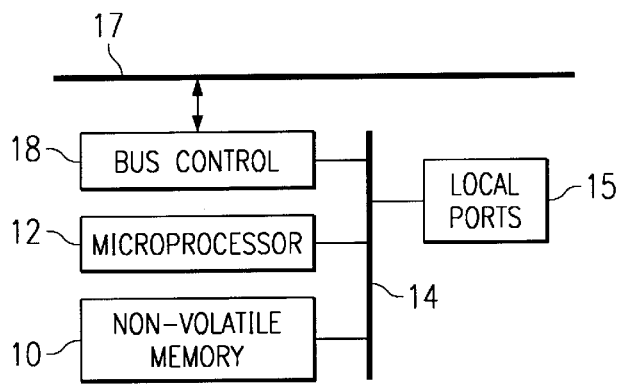
FIG. 1 is a block diagram of a microprocessor and non-volatile memory system arranged in accordance with an embodiment of the present invention.
Figure 2:
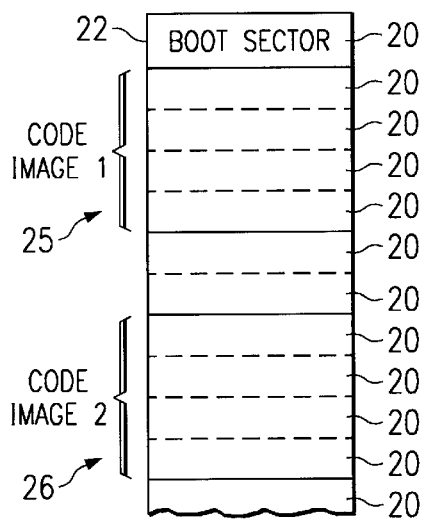
FIG. 2 is a diagrammatic representation of the content of the non-volatile memory of FIG. 1.

Referring to FIGS. 1 and 2, firmware, or programs stored in non-volatile memories, such as non-volatile memory 10, are employed in microprocessor systems which are used as specialized controllers or to implement specific functions. Examples are microprocessor systems to control data storage drives, such as hard disk drives, tape drives, or optical drives, to control accessors having interacting servo motors, or to control communication links between interacting mechanisms. The example of a microprocessor system illustrated in FIG. 1 comprises the non-volatile memory 10, a microprocessor 12, which may include a memory (RAM) for storing its operating program, a local bus 14 coupled to the non-volatile memory 10 and the microprocessor 12, local ports 15 coupled to the local bus 14, which may be coupled to devices operated by the microprocessor 12, a remote bus 17, and a bus control 18 coupled to, and controlling the transfer of information between, the remote bus 17 and the local bus 14. As an alternative, the non-volatile memory 10 may be included in the microprocessor 12. As another alternative, the microprocessor RAM may be located on local bus 14. As still another alternative, the remote bus may be contained in the microprocessor 12.

One example of the use of such firmware is in embedded systems, where the microprocessor and firmware system is embedded in a component. As a specific example, the microprocessor and firmware system may be embedded in, and operate an accessor of an automated data storage library. The microprocessor 12 will respond to commands and information received from the host system on the remote bus 17, and will respond to feedback from local ports 15, and will provide specific commands and information at the local ports 15. The provided commands and information may operate servo motors of the accessor to move and precisely position the accessor at a desired location.

The microprocessor 12 may require initialization each time that it is powered on, or at specific intervals, in accordance with the needs of the system in which the microprocessor and firmware system are embedded. In accordance with the present invention, the operation program, possibly including both the operating system and the application software for the microprocessor, is stored in the non-volatile memory 10, and may be fully or partially loaded into the memory of microprocessor 12 at initialization.

The firmware will need to be updated from time to time to correct problems or to add new functions, and the firmware may become corrupted from a voltage spike or stray signal. Especially in embedded systems, it is desirable to provide a means of updating the firmware or of correcting the firmware as implemented in the microprocessor system without replacing the component or system in which the firmware is located, and with a minimum of human intervention. As discussed above, should a fault occur in providing the corrected or updated firmware or boot sector in the systems of the prior art, the microprocessor would become brain dead, and the microprocessor system, and perhaps the entire component, would have to be replaced.

In accordance with an embodiment of the present invention, with reference to FIG. 2, the non-volatile memory 10 is arranged in sectors 20, which may be separately erased. An example of a non-volatile memory 10 is a flash memory from commercial sources such as Intel or AMD. A non-volatile memory may comprise a total capacity typically ranging from 128 kilobytes (KB) to 16 megabytes (MB). For example, the memory may comprise 4 megabytes (MB), and each sector may comprise 64 kilobytes (KB).

In accordance with the present invention, at least one of the sectors comprises a boot sector 22, which is separate from other sectors, and in which is written a relatively simple boot program, making the need to update the boot program a rare event. As an example, the boot program may comprise only 1 KB of the memory and comprise only one sector.

Also in accordance with the present invention, multiple copies 25, 26 of the operational code are stored in the non-volatile memory 10. Each operational code copy 25, 26 is stored in at least one of the sectors 20 separate from other of the copy sectors, and may be accessed and erased separately from the other copies, based on the sector erasability of the non-volatile memory 10. The redundant operational code copies protect against a fault (such as an ESD spike) to one copy, and protect against a fault during an update making the component brain dead.

Figure 3:
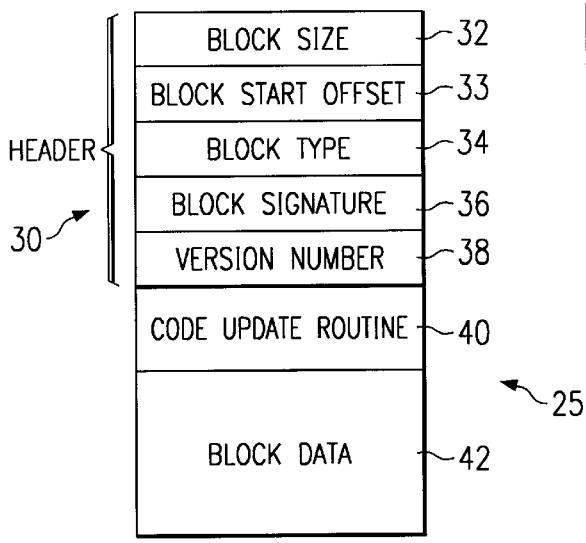
FIG. 3 is a diagrammatic representation of a code block.

Referring additionally to FIG. 3, each of the operational code copies comprises a block, e.g., code block 25, having a header 30. The header may comprise information such as the size 32 of the code block, the offset 33 to the start of the body of the code, and the type of block 34, such as an operational code copy. A similar header may be employed for the boot code, and will be designated in section 34 as a boot code block. The end of the code block can be determined from the size of the code block in section 32. In an incoming data stream, the end of the code block indirectly indicates where the next block begins. With the block type information of section 34, the blocks in an incoming code image could be arranged in a different order than that in the non-volatile memory 10.

To insure that no erroneous determination is made in checking whether the code is corrupted due simply to randomness in errors, a block signature 36 is provided in the header. It is a series of hexadecimal digits arranged in a predetermined pattern based on the type of block or product and that will not change for a given product. Additionally, the signature 36 is always placed in the same location for every version of the code. This provides an additional check that the code being checked is real firmware and not some random data. As an alternative, the block signature 36 may also comprise the block type information 34.

An important aspect of the present invention is the version number of the current code block, which is provided in section 38. This is the identifier that is used by the present invention to determine the relative update level of the code image.

As discussed above, the boot program in the boot sector 22 of FIG. 2 is relatively simple, and therefore does not include an update routine. In accordance with the present invention, the update of a code image is conducted by executing a code update routine out of the incoming update code image. Thus, the operational code image 25 incorporates an update routine 40. In this manner, when an update code image is provided, the update routine 25 is executed by the microprocessor to update the non-volatile storage sectors with the new code image. Specifically, the update routine is copied to the microprocessor RAM and executed, since a typical flash non-volatile memory cannot simultaneously be updated and executed.

A key benefit of using the new, incoming routines to conduct the update is that it simplifies the regression testing that must be done to insure compatibility, since no older, existing update routine need be considered in arranging the update code image.

Lastly, the block comprises the body 42, which, in the case of the code image 25, 26, comprises the operational code. The body 42 includes the update routine 40, and a pointer to the update routine may be provided in the header.

Figure 4:
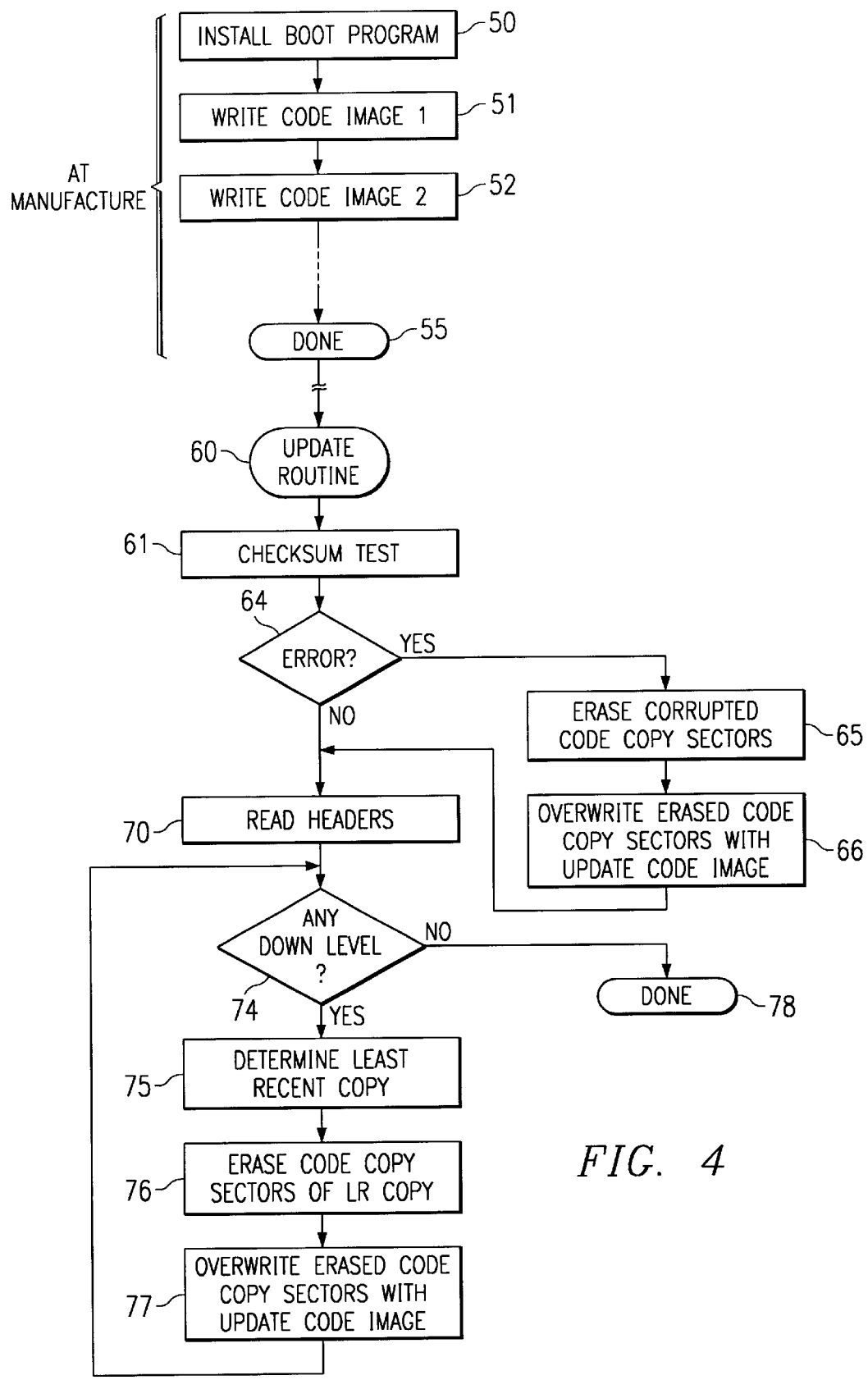
FIG. 4 is a flow chart depicting an embodiment of a method of writing and updating code images in the non-volatile memory of FIGS. 1 and 2 in accordance with the present invention.

FIG. 4 illustrates an embodiment of a method of writing and updating code images in the non-volatile memory in accordance with the present invention. Referring additionally to FIGS. 1–3, initially, in the manufacture of the microprocessor system, in step 50, a boot program is pre-installed in the non-volatile memory 10. The boot program is written to, preferably, a single sector 22 of the non-volatile memory which is separately erasable from the other sectors 20, and is separately accessible.

Next, in step 51, one code image of the operational code, e.g., code image 25, is written to the non-volatile memory 10, and, in step 52, a redundant copy of the code image, e.g., operational code copy 26, is written to the non-volatile memory 10. As discussed above, each operational code copy 25, 26 is stored in at least one of the sectors 20 separate from other of the copy sectors, and may be accessed and erased separately from the other copies, based on the sector erasability of the non-volatile memory 10. Additional redundant copies may be stored in additional steps, until the process is complete at step 55.

Initialization of the microprocessor with the operational code will be discussed hereinafter.

From time to time, the operational code must be updated. As an example, a problem has been identified and fixed, or new functionality added.

The updated code image is thus provided at remote bus 17 to bus control 18, and is placed on the local bus 14. In accordance with an aspect of the present invention, the updated code image provides its own update routine 40 in step 60 for operating the microprocessor 12 to update the non-volatile memory 10.

The first operation 61 of the update routine is to conduct a check of each of the downlevel code copies in the non-volatile memory 10 to determine whether any of the downlevel code copies is corrupted. This checksum operation may be conducted by the microprocessor 12, as is known to those of skill in the art. For example, a negative checksum value is provided within the code such that a checksum test algorithm will read the entire image with the checksum value and an all zero remainder will indicate that the information is correct, and a non-zero remainder will indicate that the information is corrupted. Even if there is an all zero remainder, the block signature 36 is separately employed as an additional check that the code being checked is real firmware and not some random data. As an alternative, a predetermined checksum remainder value may be separately provided, and compared to the algorithm remainder to indicate any error, as is known to those of skill in the art.

In the event that one or more of the copies of the operational code is corrupted, as identified in step 64, the sectors 20 of the non-volatile memory 10 containing the corrupted code copy(ies) are erased in step 65 and overwritten with the update code image in step 66. Any preexisting corrupted operational code copies are removed from the non-volatile memory as the result of steps 64–66, and, hopefully, replaced with updated, uncorrupted code images. In steps 65 and 66, as much of the corrupted copy is erased and overwritten as possible to best insure that the new copy is not corrupted. In the event that step 64 identified no corrupted copies of the operational code, step 64 leads to step 70, as does completion of step 66.

In step 70, the update routine reads the update level information 38, for example in the headers 30, of each of the operational code copies 25, 26 to determine the version number of each of the copies. This may include any copies written in step 66.

Step 74 determines whether any of the operational code copies is downlevel from the update code image. If any of the code copies is downlevel, "YES" in step 74, the update routine, in step 75, determines the least recent operational code copy. In step 76, the update routine erases the separately erasable sectors 20 containing the least recent operational code copy, and, in step 77, overwrites the erased code copy sectors with the update code image. Thus, the oldest operational code copy has been overwritten with the new operational code. The overwriting process of step 77 may comprise a total rewriting of the code copy, or may comprise a saving of some of the downlevel copy and replacement of the remaining code. Further, the erasure of step 76 may be limited to certain of the sectors 20 to save some of the code while erasing and overwriting other sectors. The precise process is determined by the update routine 40. The process then cycles back to step 74 to again determine whether any of the present operational code copies is downlevel from the update code image. Steps 75–77 are repeated for each downlevel copy of the operational code in the non-volatile memory 10 until either step 74 indicates that no downlevel copies remain and the process is completed in step 78, or until the process is interrupted.

Figure 5:
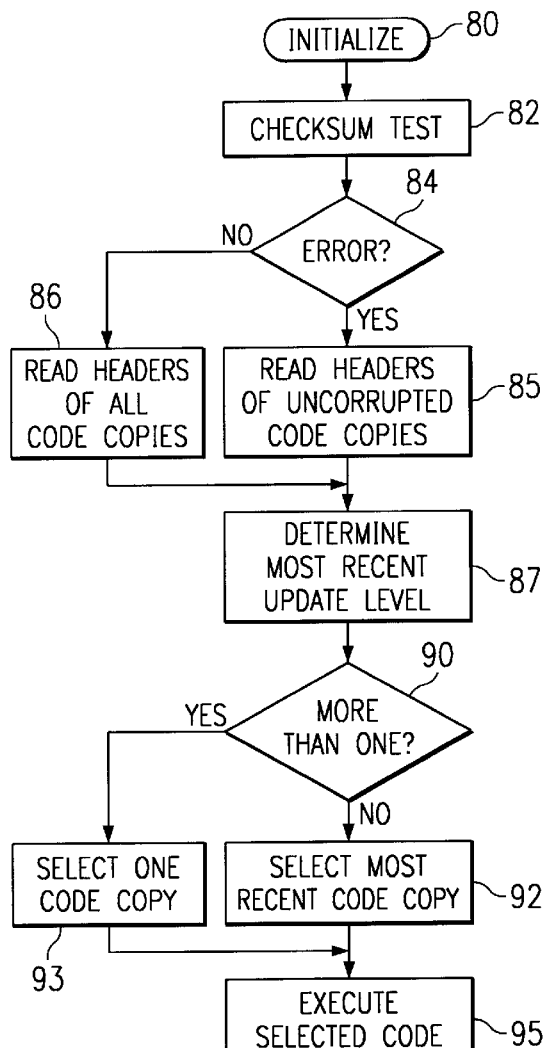
FIG. 5 is a flow chart depicting an embodiment of a method of initializing the microprocessor of FIG. 1 with code stored in the non-volatile memory of FIGS. 1 and 2 in accordance with the present invention.

FIG. 5 illustrates an embodiment of a method of selecting a copy of the operational code from the non-volatile memory for initializing the microprocessor in accordance with the present invention, beginning at step 80.

Referring additionally to FIGS. 1–3, the boot program in sector 22 of the non-volatile memory first, in step 82, operates the microprocessor 12 to conduct a check of each of the operational code copies 25, 26 in the non-volatile memory 10 to determine whether any of the copies is corrupted. This check may be identical to that discussed above with respect to the update process, and may be conducted by the microprocessor 12. As discussed above, a negative checksum value is provided, and a checksum algorithm is employed to check the block for errors. Again, the block signature 36 is separately checked to insure that the code being checked is real firmware and not some random data.

In the event that one or more of the copies of the operational code is corrupted, as identified in step 84, the boot program reads the headers of only the uncorrupted code copies in step 85 to determine the version number from section 38 of the header. If none of the copies was corrupted, the boot program reads the version numbers 38 in the headers of all of the operational code copies in step 86.

In step 87, the boot program operates the microprocessor 12 to determine the one(s) of the copies having the most recent update level from the version numbers read in step 85 or in step 86. Step 90 determines whether more than one copy of the operational code is at the most recent update level. If only one uncorrupted copy is at the most recent update level, the boot program, in step 92, selects the copy which is at the most recent update level. If more than one copy is at the most recent update level, the boot program employs a algorithm to select one of the operational code copies in step 93. One example of an algorithm comprises selecting the code copy 25, 26 which is next in a round-robin sequence.

Having selected one of the operational code copies, the boot program, in step 95, initializes the microprocessor 12 to execute the selected code, as is known to those of skill in the art.

Alternative arrangements of the microprocessor and non-volatile store system and alternative arrangements of the steps of FIGS. 4 and 5 may be envisioned by those of skill in the art. As one example, the update process may be conducted by a separate microprocessor also located on the local bus 14. As another example, the checksum tests 61 and 82 may be conducted at other points in the update and boot initialization processes.

While the preferred embodiments of the present invention have been illustrated in detail, it should be apparent that modifications and adaptations to those embodiments may occur to one skilled in the art without departing from the scope of the present invention as set forth in the following claims.

I claim:

1. A method for generating a redundant, updatable, self-booting program in a sectored, non-volatile memory, said memory having separately erasable sectors, comprising the steps of:

writing said memory with a boot program in at least one of said sectors;

writing said memory with at least two copies of operational code, each said operational code copy written in at least one of said sectors separate from said boot sector and separate from other of said copy sectors, each said operational code copy comprising information indicating the relative update level of said operational code copy, whereby said copies may be separately updated and have different update levels;

said boot program reading said update level information to determine the most recent said update level of said operational code copies; and said boot program executing said operational code copy having said most recent update level.

2. The method of claim 1, additionally comprising the steps of:

prior to said update level information reading step, said boot program testing said operational code copies to determine whether any of said operational code copies is corrupted; and conducting said update level information reading step of only those of said copies determined to be uncorrupted in said boot program testing step.

3. The method of claim 2, wherein said testing step comprises conducting a checksum test of each said operational code copy and testing the checksum remainder for errors.

4. The method of claim 1, additionally comprising the steps of:

an update routine reading said update level information;

said update routine determining from said read update level information the least recent said update level of said operational code copies; and said update routine updating said operational code copy having said least recent update level.

5. The method of claim 4, wherein said updating routine updating step comprises erasing and updating only said sectors having said programmed operational code copy.

6. The method of claim 4, additionally comprising the steps of:

said update routine reading said update level information to determine whether any of said copies has an update level less recent than said copy of said updating step; and if any of said copies has said less recent update level, said update routine repeating said least recent determining and operational code updating steps, until all of said copies are at said update level of said copy of said updating step.

7. The method of claim 1, additionally comprising the steps of:

an update routine testing said operational code copies to determine whether any of said operational code copies is corrupted; and said update routine erasing said corrupted operational code copy and overwriting said copy with an updated operational code copy.

8. The method of claim 7, wherein said updating routine erasing and overwriting step comprises erasing and overwriting only said sectors having said corrupted operational code copy.

9. The method of claim 7, wherein said testing step comprises conducting a checksum test of each said operational code copy and testing the checksum remainder for errors.

10. The method of claim 7, additionally comprising the steps of:

subsequent to said update routine testing step and any said update routine erasing and overwriting steps, said update routine reading said update level information;

said update routine determining from said read update level information the least recent said update level of said operational code copies; and said update routine updating said operational code copy having said least recent update level.

11. The method of claim 1, additionally comprising the steps of:

an update routine contained in an input update code image updating said operational code copies having a less recent update level than said input update code image.

12. A system for providing a redundant, updatable, self-booting program, comprising:

a sectored, non-volatile memory, having separately erasable sectors, said memory storing at least two copies of operational code, each said operational code copy stored in at least one of said sectors separate from other of said copy sectors, each said operational code copy having information indicating the relative update level of said operational code copy, whereby said copies may be separately updated and have different update levels;

a boot processor, employing a boot program stored in at least one of said sectors of said non-volatile memory, separate from said operational code copy sectors, said boot processor comprising a microprocessor operated to read said update level information to determine the most recent said update level of said operational code copies, and said boot processor operating said microprocessor to execute said operational code copy having said most recent update level.

13. The system of claim 12, wherein said boot processor, additionally:

prior to reading said update level information, testing said operational code copies to determine whether any of said operational code copies is corrupted; and reading said update level information of only those of said copies determined to be uncorrupted in said testing.

14. The system of claim 13, wherein said boot processor conducts said testing, conducting a checksum test of each said operational code copy and testing the checksum remainder for errors.

15. The system of claim 12, additionally comprising an update processor comprising code operating a microprocessor to update said operational code copies: reading said update level information; determining from said read update level information the least recent said update level of said operational code copies; and updating said operational code copy having said least recent update level with an update code image.

16. The system of claim 15, wherein said update processor updates only said sectors of said non-volatile memory having said least recent update level operational code copy.

17. The system of claim 15, wherein said update processor additionally reads said update level information to determine whether any of said copies has an update level less recent than said update code image, and, if any of said copies has said less recent update level, updating said operational copies having said less recent update level, until all of said copies are at said update level of said update copy.

18. The system of claim 15, wherein said update processor additionally tests said operational code copies to determine whether any of said operational code copies is corrupted, requesting the erasure of any said corrupted operational code copy and overwriting said copy with an updated operational code image.

19. The system of claim 18, wherein said update processor conducts said testing, conducting a checksum test of each said operational code copy and testing the checksum remainder for errors.

20. The system of claim 18, wherein said boot processor, subsequent to said testing and any updating, erasing and overwriting: reads said update level information, determining from said read update level information the most recent said update level of said operational code copies, and operates said microprocessor to execute said operational code copy having said most recent update level.

21. The system of claim 12, additionally comprising an update processor comprising update routine operating a microprocessor to update said operational code copies, and wherein said update processor routine is incorporated in an input update code image for updating said operational code copies.

22. A redundant, updatable, self-booting computer program product usable with a programmable computer having computer readable program code embodied therein, for use with a sectored, non-volatile memory, said memory having separately erasable sectors, said memory having at least two copies of operational code, each said operational code copy in at least one of said sectors separate from other of said copy sectors, each said operational code copy having information indicating the relative update level of said operational code copy, whereby said copies may be separately updated and have different update levels, comprising;

computer readable program code which causes a computer processor to read said update level information to determine the most recent said update level of said operational code copies; and computer readable program code which causes a computer processor to execute said operational code copy having said most recent update level.

23. The computer program product of claim 22, additionally comprising computer readable program code which causes a computer processor to, prior to reading said update level information, test said operational code copies to determine whether any of said operational code copies is corrupted; and to read said header of only those of said copies determined to be uncorrupted in said test.

24. The computer program product of claim 23, wherein said computer readable program code which causes a computer processor to test said operational code copies, causes said computer processor to conduct a checksum test of each said operational code copy and test the checksum remainder for errors.

25. The computer program product of claim 22, additionally comprising computer readable program code which causes a computer processor to read said update level information; to determine from said read update level information the least recent said update level of said operational code copies; and to update said operational code copy having said least recent update level.

26. The computer program product of claim 25, wherein said computer readable program code which causes a computer processor to update said operational code copy having said least recent update level causes said computer processor to erase and update only said sectors having said least recent update level operational code copy.

27. The computer program product of claim 25, additionally comprising computer readable program code which causes a computer processor to read said update level information to determine whether any of said copies has an update level less recent than an update code image, and if any of said copies has said less recent update level, to determine from said read update level information the least recent said update level of said less recent operational code copies, and update said operational code copy having said least recent update level, until all of said copies is at said update level of said update code image.

28. The computer program product of claim 22, additionally comprising computer readable program code which causes a computer processor to test said operational code copies to determine whether any of said operational code copies is corrupted, to erase said corrupted operational code copy, and to overwrite said copy with an updated operational code image.

29. The computer program product of claim 28, wherein said computer readable program code which causes a computer processor to erase and overwrite said corrupted operational code copy having said least recent update level causes said computer processor to erase and overwrite only said sectors having said corrupted operational code copy.

30. The computer program product of claim 28, wherein said computer readable program code which causes a computer processor to test said operational code copies, causes said computer processor to conduct a checksum test of each said operational code copy and test the checksum remainder for errors.

31. The computer program product of claim 28, additionally comprising computer readable program code which causes a computer processor, subsequent to said testing and any said erasing and overwriting, to read said update level information, to determine from said read update level information the least recent said update level of said operational code copies, and to update said operational code copy having said least recent update level.

32. The computer program product of claim 22, additionally comprising update computer readable program code which causes a computer processor to respond to an update code image and update any said operational code copy having a less recent update level than said update code image, said update computer readable program code contained in said update code image.

* * * * *